INVENTOR.
HAROLD J. SLOAN

ATTORNEYS

United States Patent Office 3,487,198
Patented Dec. 30, 1969

3,487,198
ELECTRIC OVEN TYPE EGG COOKER
Harold J. Sloan, 1522 W. 2nd Place, Tulsa, Okla. 73108
Filed Dec. 29, 1967, Ser. No. 694,636
Int. Cl. F27d *11/00;* A21b *1/22;* H05b *3/02*
U.S. Cl. 219—397                1 Claim

ABSTRACT OF THE DISCLOSURE

"Over-easy" eggs are cooked in faster than normal time and without actually turning the eggs over in an oven having spaced electric heating elements above and below an egg skillet.

BACKGROUND OF THE INVENTION

This invention relates to cooking apparatus utilizing electrical heating means for foods particularly for cooking eggs. In the art of commercial egg cooking, by far the most popular ordered form of cooked egg is what is known as "over-easy." This has generally means that an egg is to be cooked in a pan with a small level of grease on one side until the albumen or white portion is cooked leaving the yoke still liquid. At this point the egg is to be turned over to form a cooked albumen film over the yoke still leaving it with some liquidity. In many commercial restaurants the ability to cook a true "over-easy" egg becomes impeded by the demand and the proper timing necessary to turn the egg over. Hence, in many instances a customer does not receive an actual and true "over-easy" egg.

SUMMARY

Accordingly, it is an object of this invention to provide an egg cooker which is adaptable to provide a quickly cooked "over-easy" type of egg utilizing a minimal amount of grease, typically only that needed to grease the pan, and which permits the cooking process without turning the egg over.

These and other objects of the invention will become more apparent with reference to the specification, claims and drawings appended hereto.

DESCRIPTION OF THE PREFERRED EMBODIMENT

Figure 1:
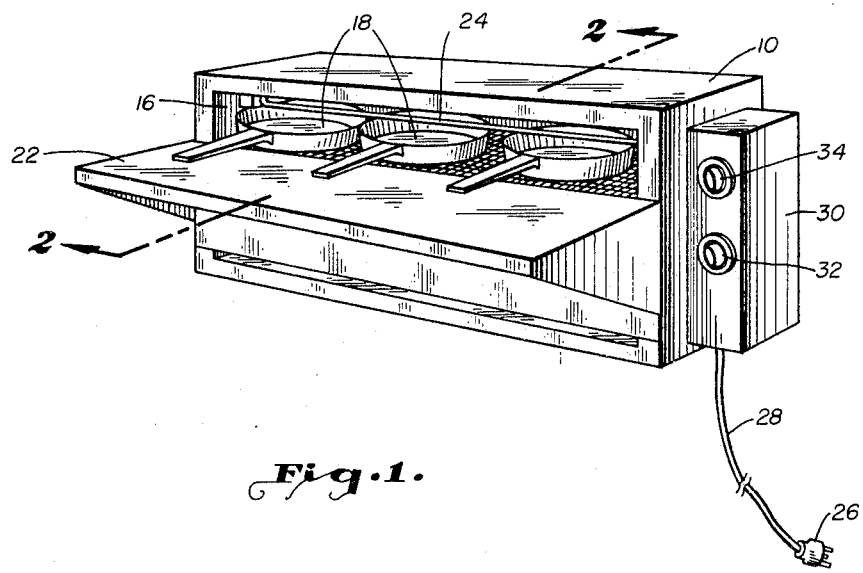
FIGURE 1 is a perspective view of the egg cooking apparatus of this invention.
Figure 2:
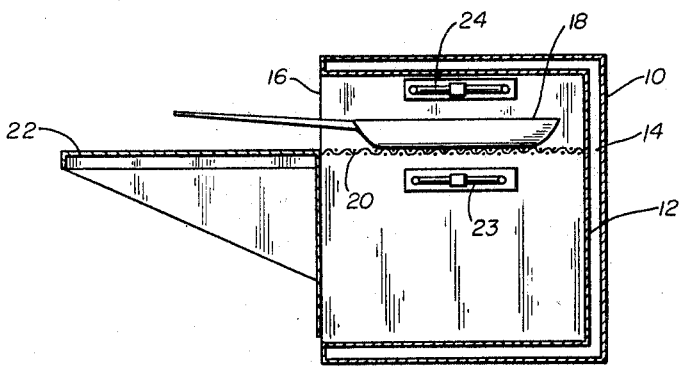
FIGURE 2 is a sectional view taken along the line 2—2 of FIGURE 1.

Referring now to the figures, the numeral 10 refers to a metallic housing which may be of double wall construction with an inner frame 12 forming an air space 14 or a space which may be filled with appropriate and well known heat insulating material. The frame 10 is so constructed to provide a frontal opening 16 sufficiently wide to permit insertion of an egg skillet 18 which is of a type and design well known in the art. The skillet rests upon a screen or grid 20 which is substantially at the same level as a supporting convenience shelf 22 forwardly thereof. Beneath the screen or grid not more than about one-half inch therebelow is a U-shaped Calrod unit 23, both legs of which extend longitudinally therebelow. An identical Calrod unit 24 is positioned above the grid 20 such that the top of the eggs within skillet 18 will not more than one and one-half inches away. An electrical plug 26 is adapted to supply current by way of conduits 28 to the control unit 30 which may include a lower unit control 32 and an upper unit control 34. A timer mechanism, not shown, may also be incorporated in the control. Preferably, the lower Calrod unit produces about 1,000 watts while the upper Calrod unit is designed to produce about 2,000 watts.

In the operation of the device a six-inch egg skillet is typically used and first provided with a thin film of grease. Thereafter the egg is broken into the pan and the unit having already been turned on and preheated to the desired temperature. The skillet is then inserted into the opening 16 and in some instances produces an "over-easy" egg in 45 seconds.

The invention has been described with reference to specific and preferred embodiments. It will be apparent, however, that other modifications can be made without departing from the spirit and scope of the invention. For example, although this invention has been specifically described with reference to a commercial usage, it is to be understood that the device is applicable to a domestic unit in the home. In addition, although electric heating is preferred it is to be understood that gas type heating units may be substituted for said heating units described. Further, additional heating elements may be placed or otherwise attached to the device for cooking eggs in other well known manners so as to construct a basic egg cooking area. Accordingly this invention should be construed not to be limited to the embodiment herein described but should be limited by the scope of the appended claims.

What is claimed:
1. An egg cooker comprising,
   an enclosed housing having a frontal opening to receive a plurality of egg skillets;
   a grid in said housing to support said skillets;
   a shelf forwardly of said opening and substantially at the same level as said grid;
   an upper U-shaped Calrod-type heating element slightly about said skillet when placed on said grid;
   a lower U-shaped Calrod-type heating element slightly below said grid; and
   electrical means to cause heating of said elements wherein the heat of said upper element is capable of being greater than said lower element.

References Cited

UNITED STATES PATENTS

| | | | |
|---|---|---|---|
| 1,154,114 | 9/1915 | Hadaway | 219—397 |
| 1,861,472 | 6/1932 | Glitzke | 219—390 |
| 2,442,407 | 6/1948 | Gibbons et al. | 219—388 |
| 2,745,937 | 5/1956 | Welch | 219—397 |
| 3,037,443 | 6/1962 | Newkirk et al. | 99—332 |
| 3,208,808 | 9/1965 | Knapp | 99—448 X |

VOLODYMYR Y. MAYEWSKY, Primary Examiner

U.S. Cl. X.R.
99—331, 448; 219—484